United States Patent
Schmitt et al.

(10) Patent No.: US 8,464,027 B2
(45) Date of Patent: Jun. 11, 2013

(54) PROGRAMMABLE FILTER PROCESSOR SELECT ALGORITHM AND PARAMETERS AND PASS TIME/ANGLE STAMP IN PARALLEL WITH A/D DATA IN PIPELINED LOGIC

(75) Inventors: Stephen Schmitt, Nuertingen (DE); Juergen Mallok, Reutlingen (DE); Juergen Hanisch, Bempflingen (DE)

(73) Assignee: Robert Bosch GmbH, Stuttgart (DE)

( * ) Notice: Subject to any disclaimer, the term of this patent is extended or adjusted under 35 U.S.C. 154(b) by 578 days.

(21) Appl. No.: 12/668,190

(22) PCT Filed: Jul. 8, 2008

(86) PCT No.: PCT/EP2008/058824
§ 371 (c)(1),
(2), (4) Date: Jan. 7, 2010

(87) PCT Pub. No.: WO2009/021780
PCT Pub. Date: Feb. 19, 2009

(65) Prior Publication Data
US 2010/0199070 A1   Aug. 5, 2010

(30) Foreign Application Priority Data
Aug. 16, 2007 (DE) .................. 10 2007 038 545

(51) Int. Cl.
*G06F 9/38* (2006.01)
(52) U.S. Cl.
USPC ............................................. 712/36; 712/37
(58) Field of Classification Search
None
See application file for complete search history.

(56) References Cited

U.S. PATENT DOCUMENTS

| | | | | |
|---|---|---|---|---|
| 4,920,480 A | * | 4/1990 | Murakami et al. | 712/36 |
| 6,282,631 B1 | | 8/2001 | Arbel | |
| 7,200,735 B2 | * | 4/2007 | Wang et al. | 712/33 |

FOREIGN PATENT DOCUMENTS

| | | |
|---|---|---|
| EP | 1564646 | 8/2005 |
| WO | WO 2004/023314 | 3/2004 |

OTHER PUBLICATIONS

International Search Report, PCT International Patent Application No. PCT/EP2008/058824, dated Nov. 17, 2008.
Walter Tuttlebee: "Software Defined Radio—Part IV" 2002, John Wiley & Sons, Ltd., USA XP002501626 ISBN: 0-470-84318-7; p. 299, Section 10.3.4.1.
Amos R. Omondi: "The Microarchitecture of Pipelined and Superscalar Computers—Chapter 1", 1999, Kluwer Academic Press, Dordrecht, The Netherlands, XP002501436 ISBN 0-7929-8463-6; Sections 1.2 and 1.5.1; Figures 1.3 and 1.4.
Hallvard N. SS: "A programmable DSP for low-power, low-complexity baseband processing", INET, 2006, XP002501435, Norwegian University of Science and Technology, Trondheim Gefunden im Internet:   URL:http://daim.idi.ntnu.no/masteroppgaver/IME/IET/2006/1211/masteroppgave.pdf> [gefunden am Oct. 27, 2008] p. 1, first paragraph; p. 5, Section 2.24; Sections 3.5.1, 5.2 & Abb. 15; Sections 5.3.1, 5.3.2, 7.1, 7.2 and Table 12; p. 30, 2. Section.

* cited by examiner

*Primary Examiner* — Kenneth Kim
(74) *Attorney, Agent, or Firm* — Kenyon & Kenyon LLP

(57) ABSTRACT

A programmable filter processor which is adaptable to different filtering algorithms, a plurality of different software algorithms being executable, the programmable filter processor including a logic unit which includes a plurality of pipeline stages; a first memory in which the software algorithms are stored; a second memory in which raw data and parameters for the different filter algorithms are stored; and an address generating unit which is controllable via a program counter, the address generating unit being developed to generate control commands for the second memory and the logic unit.

11 Claims, 1 Drawing Sheet

PROGRAMMABLE FILTER PROCESSOR SELECT ALGORITHM AND PARAMETERS AND PASS TIME/ANGLE STAMP IN PARALLEL WITH A/D DATA IN PIPELINED LOGIC

FIELD OF THE INVENTION

The present invention relates to a programmable filter processor which is adaptable to different filtering algorithms, and a filtering method which is adjusted to different filtering algorithms.

BACKGROUND INFORMATION

The development of hardware and software for engine control units keeps becoming more difficult because of cost pressure in the automobile field.

Today's signal processing in microchips is mostly carried out using software. In the case of voluminous calculations such as of filtering algorithms, the problem of real-time capability often comes up, since the microchip has a series of other tasks to perform at the right time. Genuine and, particularly, multiple parallelism of controller structures is usually avoided for reasons of cost.

SUMMARY

It is an object of the present invention to make possible the rising complexity and the required parallelism of signal acquisition and signal preprocessing at the high data quantity that is arising.

This object may be attained by a programmable filter processor, which is adaptable to different filtering algorithms, a plurality of different software algorithms being executable, the programmable filter processor including a logic unit which includes a plurality of pipeline stages; a first memory in which the software algorithms are stored; a second memory in which raw data and parameters for the different filtering algorithms are stored; and an address generating unit which is controllable via a program counter, the address generating unit being developed to generate control commands for the second memory and the logic unit. According to the present invention, the programmable filter processor is able to be adapted very flexibly to different filtering algorithms. The processor may be programmed via assembler instructions and it In one advantageous specific embodiment of the programmable filter processor, the address generating unit is furthermore developed to fill registers of the second memory and the logic unit with data. Because of that, the programmable filter processor is easy to adapt to different signal processing tasks.

In one further advantageous specific embodiment of the programmable filter processor, the logic unit is developed to process the data. Different functions are thereby able to be implemented in hardware within the logic unit.

In another advantageous specific embodiment of the programmable filter processor, the logic unit is developed to store results of the processed data once again in the second memory. Because of that, the programmable filter processor is easy to adapt to different signal processing tasks.

In yet another advantageous specific embodiment of the programmable filter processor, predetermined functions are implemented in hardware within the logic unit, by which the programmable filter processor is adaptable to predetermined signal processing tasks. Different functions are thereby able to be implemented in hardware within the logic unit.

In still another advantageous specific embodiment of the programmable filter processor, a plurality of general registers is implemented in the logic unit which are developed for buffer-storing partial results. Context changes are thereby made possible so that one is able to process time-critical signal processing tasks in real time. In this case, however, the programmer must make sure that no general register contents are overwritten.

In another advantageous specific embodiment of the programmable filter processor, a data path is implemented in the logic unit, which is developed to transmit a time stamp and an angle stamp along with and in parallel to an analog/digital converter datum through the logic unit. This makes it possible to treat time stamps that are correlated with values of the analog/digital converter. In this instance, the programmable filter processor brings along advantages over other digital signal processors, since its hardware architecture is still able to be adapted.

In one additional advantageous specific embodiment of the programmable filter processor, the programmable filter processor is developed so as to work with the data set, and parallel to it, to load an additional data set into the first memory of the programmable filter processor. Because of that, the programmable filter processor is easy to adapt to different signal processing tasks.

The present object is also attained by a filtering method that is adjusted to different filtering algorithms, a plurality of different software algorithms being executed, the filtering method including storing the software algorithms in a first memory; storing raw data and parameters for the different filtering algorithms in a second memory; activating an address generating unit via a program counter; and generating control commands for the second memory and the logic unit in the address generating unit. The programmable filter processor is able to be adjusted very flexibly to different filtering algorithms by this filtering method according to the present invention. The processor may be programmed via assembler instructions and has a logic unit made up of a plurality of pipeline stages.

In one further advantageous specific embodiment of the method, the additional step is included of filling registers of the second memory and the logic unit with data. Because of that, the filtering method is easy to adapt to different signal processing tasks.

In one additional advantageous specific embodiment of the method, the additional step is included of processing the data in the logic unit. Different functions are thereby able to be implemented in hardware within the logic unit.

In one additional advantageous specific embodiment of the method, the additional step is included of storing results of the processed data in the second memory. Because of that, the filtering method is easy to adapt to different signal processing tasks.

BRIEF DESCRIPTION OF THE DRAWINGS

One configuration of a programmable filter processor according to the present invention will be explained in greater detail with the aid of an exemplary embodiment. Identical or identically acting parts are provided with the same reference symbols.

DETAILED DESCRIPTION OF EXAMPLE EMBODIMENTS

Figure 1:
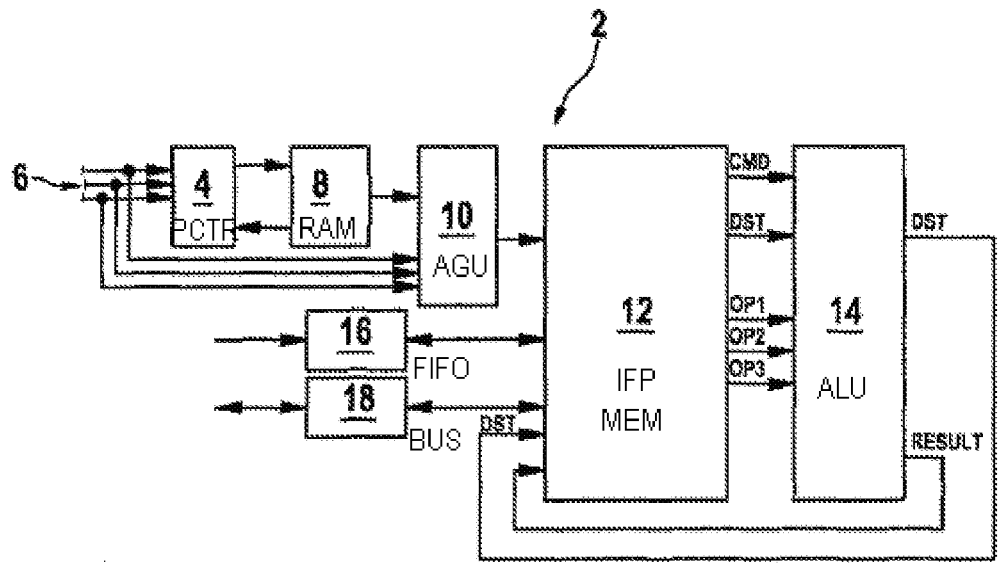
FIG. 1 shows an architecture of an integrated programmable filter processor.

FIG. 1 shows an architecture of an integrated programmable filter processor IFP 2. The programmable filter processor represents a programmable filter processor that is able to be adapted very flexibly to different filtering algorithms. Programmable filter processor 2 is able to be programmed via assembler instructions and has a logic unit made up of a plurality of pipeline stages, broadened by the processing of time stamps.

Because of the very different requirements, posited by the automobile manufacturers and sensors in the engine region, very flexible signal processing must be made possible in a companion chip. This flexibility is made possible, for one, by the reinforced use of software. For another thing, based on the rising complexity of the controllers and the arising of high data quantities, it is not possible for the microchip of the companion chip to take over all the signal processing tasks.

This is, above all, also not possible because, for example, a Cortex M3™ chip, based on a restricted bus system AHB-Lite, itself has to undertake the entire data transfer from FIFO's for further processing in its RAM. For this reason, the two signal processing modules of the integrated programmable filter processor and signal processing are also implemented within the companion chip.

The architecture, shown in FIG. 1, of the integrated programmable filter processor 2, proves to be very efficient during the implementation of new algorithms. Thus, in a radio application, for example, in which integrated programmable filter processor 2 is able to be used, it is possible to let up to 17 different software algorithms run on the same programmable filter processor hardware. The algorithm is determined, in this instance, by an entry point having a PCTR unit 4, with the aid of a trigger line 6. Three trigger lines 6 are illustrated in FIG. 1. The algorithms themselves are stored in a first memory RAM 8. An address generating unit AGU 10 is then activated via a program counter, which generates the control commands for a second memory IFP MEM 12 and for a logic unit ALU 14, or fills the registers appropriately with data. At second memory IFP MEM 12, a FIFO buffer 16 and also a bus interface 18 are connected.

Both raw data and parameters for the filtering are stored in second memory IFP MEM 12. Finally, logic unit ALU 14 processes the data, and stores the results again in second memory IFP MEM 12. Predetermined functions are thereby able to be implemented in hardware within the logic unit. The programmable filter processor is then easy to adapt to predetermined signal processing tasks, by these predetermined functions.

Because of that, integrated programmable filter processor IFP 2 is easy to adapt to different signal processing tasks. The time for developing a smart filter processor for signal improvement may then amount to less than one day.

In order to use integrated programmable filter processor IFP 2 inside a companion chip, the latter has to be broadened by additional functions. Based on the high data quantity arising, it must be possible, for instance, to load new analog/digital converter ADC data into integrated programmable filter processor IFP 2, while the latter is still busy with processing other analog/digital converter ADC data. This is implemented by two independent RAM components, between which one is able to switch over.

In addition, context changes have to be made possible so that one is able to process time-critical signal processing tasks in real time. Integrated programmable filter processor IFP 2 is already in a state of preparedness for both tasks. Thus, in logic unit ALU 14, for example, a plurality of general registers ACCU may be implemented so as to buffer-store the partial results. In this case, however, the programmer must make sure that no general register ACCU contents are overwritten.

Figure 2:
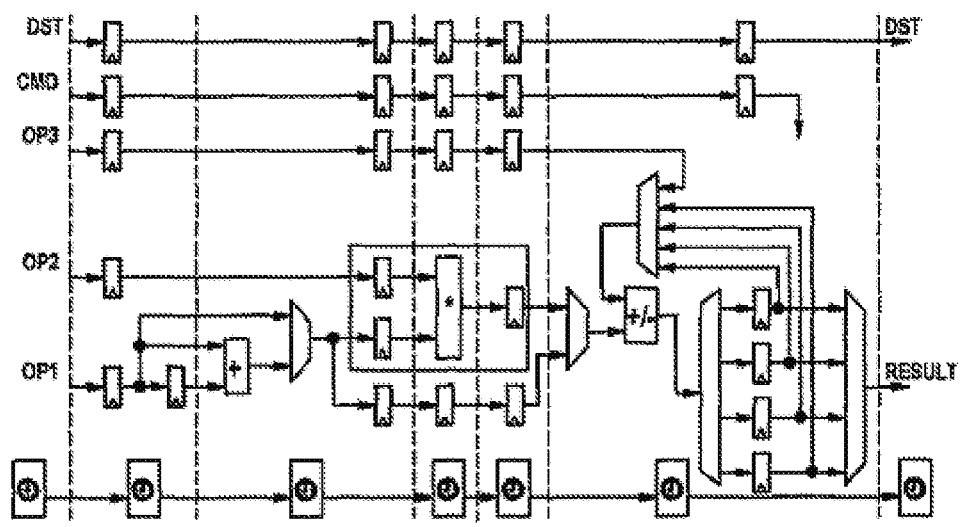
FIG. 2 shows a broadening of the logic unit of the programmable filter processor by a processing of time stamps.

FIG. 2 shows a broadening of a logic unit programmable filter processor IFP by a processing of time stamps.

A broadening of integrated programmable filter processor IFP is concerned with the treatment of time stamps, which are correlated with the analog/digital ADC values. In this instance, integrated programmable filter processor IFP brings along advantages over other digital signal processors DSP, since its hardware architecture is still able to be adapted. Thus, in the implementation of logic unit ALU (see FIG. 1), an additional data path is able to be implemented in which a time stamp or angle stamp is shifted through logic unit ALU along with and in parallel to its analog/digital converter ADC datum.

Integrated programmable filter processor IFP is used to support the signal processing for the microprocessor of the companion chip. It is made up of a plurality of components, of which logic unit ALU and also second memory IFP-MEM and first memory RAM (see FIG. 1) occupy a substantial portion of the chip area for the signal processing programs.

Integrated programmable filter processor IFP of the companion chip is supposed to be in a position to work on one data set, and in parallel to it, a second data set is supposed to be able to be loaded into the memory of integrated programmable filter processor IFP. In an example embodiment, besides the data for the task of a combustion chamber pressure (CSC-P, combustion signal based control pressure) which, on account of its complexity, has to be calculated on the microprocessor, there arises a maximum of 250 byte/cylinder (piezo voltage measurement).

Using a safety factor of two and a 0.5 KB working and shadow memory, one obtains a memory usage of 1 KB for integrated programmable filter processor IFP. This is able to be implemented using approximately 8,000 gates.

What is claimed is:

1. A programmable filter processor which is adaptable to different filtering algorithms, and via which a plurality of different software algorithms is executable, the programmable filter processor, comprising:
   a logic unit including a data path to transmit at least one of a time stamp and an angle stamp along with and in parallel to data generated from an analog-to-digital converter through a plurality of pipeline stages of the logic unit;
   a first memory in which the software algorithms are stored;
   a second memory in which raw data and parameters for the different filtering algorithms are stored; and
   an address generating unit which is controllable via a program counter, the address generating unit adapted to generate control commands for the second memory and the logic unit.

2. The programmable filter processor as recited in claim 1, wherein the address generating unit is further adapted to fill registers of the second memory and the logic unit with data.

3. The programmable filter processor as recited in claim 2, wherein the logic unit is adapted to process the data.

4. The programmable filter processor as recited in claim 3, wherein the logic unit is adapted to store results of the processed data in the second memory.

5. The programmable filter processor as recited in claim 1, wherein predetermined functions are implemented in hardware within the logic unit, by which the programmable filter processor is adaptable to predetermined signal processing tasks.

6. The programmable filter processor as recited in claim 1, wherein a plurality of working registers is implemented in the logic unit, which buffer-store partial results.

7. The programmable filter processor as recited in claim 1, wherein the programmable filter processor is adapted to work with one data set, and, in parallel, to load an additional data set into the first memory of the programmable filter processor.

8. The programmable filter processor as recited in claim 1, further comprising:
   a predictor-corrector arrangement to determine the different software algorithms.

9. The programmable filter processor as recited in claim 8, wherein the predictor-corrector arrangement includes a trigger line.

10. The programmable filter processor as recited in claim 1, further comprising:
    a first in first out ("FIFO") buffer connected to the second memory.

11. The programmable filter processor as recited in claim 1, further comprising:
    a bus interface connected to the second memory.

* * * * *

UNITED STATES PATENT AND TRADEMARK OFFICE
CERTIFICATE OF CORRECTION

PATENT NO. : 8,464,027 B2  
APPLICATION NO. : 12/668190  
DATED : June 11, 2013  
INVENTOR(S) : Schmitt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this

Eighth Day of September, 2015

Michelle K. Lee
*Director of the United States Patent and Trademark Office*